H. W. Matthews.

Thresher and Separator.

No. 28,552.

Reissued Feb. 4. 1868.

Witnesses.
R. G. Campbell
Edw. Schaffer

Inventor
H. W. Matthews
by
Mason, Fenwick & Lawrence

United States Patent Office.

HUGH W. MATTHEWS, OF CHICAGO, ILLINOIS.

*Letters Patent No.* 68,095, *dated August* 27, 1867; *reissue No.* 2,852, *dated February* 4, 1868.

IMPROVEMENT IN THRESHING-MACHINES AND SEPARATORS.

The Schedule referred to in these Letters Patent and making part of the same.

TO ALL WHOM IT MAY CONCERN:

Be it known that I, HUGH W. MATTHEWS, of Chicago, in the county of Cook, and State of Illinois, have invented certain new and useful Improvements in Threshing and Separating-Machines; and I do hereby declare that the following is a full, clear, and exact description thereof, reference being had to the accompanying drawings, making part of this specification, in which—

Similar letters of reference indicate corresponding parts in the several figures.

The object of this invention is to obtain a simple and efficient mode of conveying away straw from a threshing-device, and at the same time shaking the straw in such manner as to effect a thorough separation of the grain from it.

The nature of my invention consists in the employment, in conjunction with a threshing-drum or other suitable well-known threshing-devices, of a number of reciprocating serrated or toothed shakers, operating through an open or slatted platform or rack, upon which the threshed straw is received from the thresher, and so constructed as to give to the straw an intermittent vertical motion, and at the same time a tossing movement toward one end of platform or rack, thereby effecting a complete loosening of the straw, and a separation of the grain and chaff from it, as will be hereinafter explained.

The invention also consists in employing a series of vertically-reciprocating and longitudinally-moving straw-shakers in conjunction with a stationary platform or rack, which is so constructed as to allow said shakers to play freely through it and act upon the straw, and which will at the same time allow of a free escape of grain and chaff through it; said platform or rack being arranged so as to incline slightly toward the threshing-device, and thereby prevent a too rapid passage of the straw over it, as will be hereinafter explained.

It also consists in arranging beneath a slatted or open grain-rack or platform, and a series of longitudinally and vertically-moving straw-shakers, certain means by which all of the grain and chaff which fall through said rack or platform will be conducted into a trough, and thence conveyed out of the machine, to be subjected to the well-known winnowing and cleaning-machinery, as will be hereinafter described.

To enable others skilled in the art to understand my invention, I will describe its construction and operation.

Figure 2:
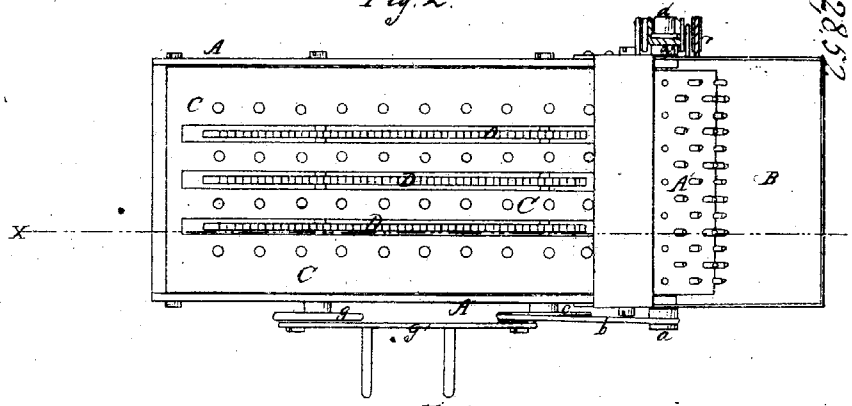
Figure 2 is a top view of the same.
Figure 5:
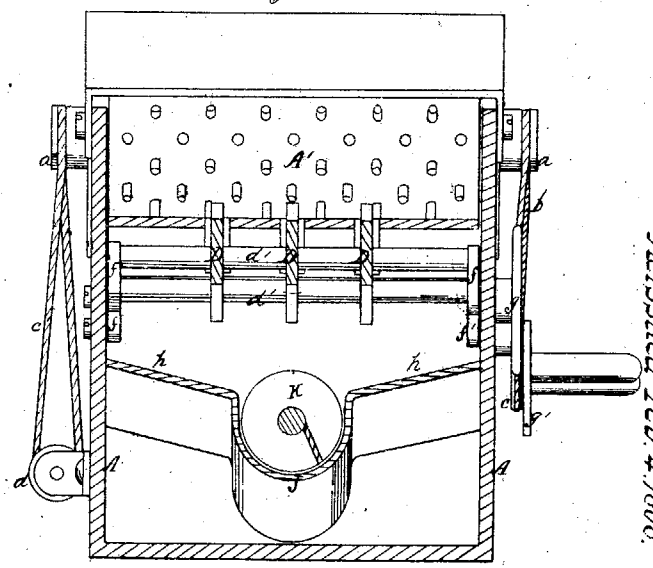
Figure 5 is an enlarged transverse section taken in the vertical plane indicated by red line *y* in fig. 3.
Figure 1:
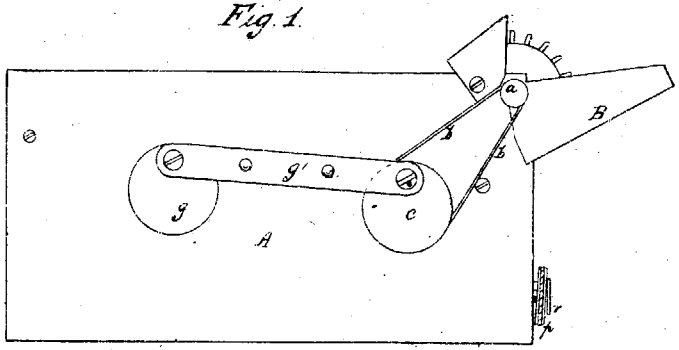
Figure 1 is an elevation of one side of the improved thresher and separator.
Figure 3:
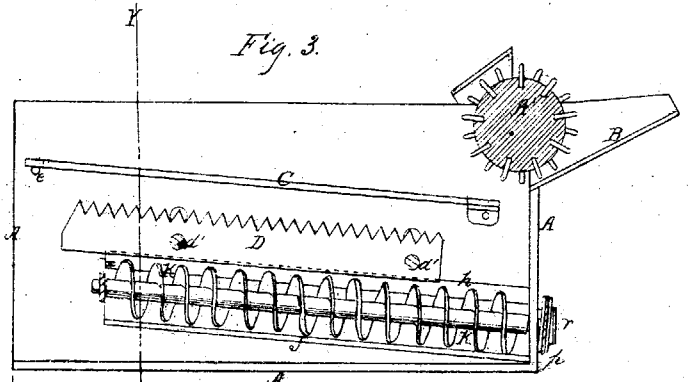
Figure 3 is a longitudinal section, taken in the vertical plane indicated by red line *x* in fig. 2, showing the straw-shakers depressed.
Figure 4:
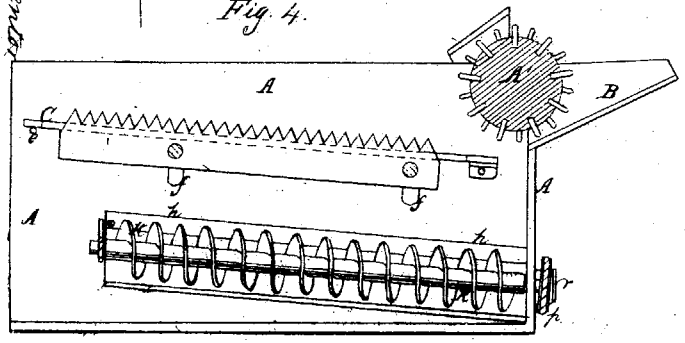
Figure 4 is a similar section of the same parts, showing the straw-shakers elevated.

In the accompanying drawings, A represents a box or framework, of a rectangular form, made in a strong and substantial manner, and provided at one end with a feed-table, over which the grain is passed on its way to the threshing-drum. The grain is threshed by means of a cylinder, A′, which is armed with studs, and arranged transversely across one end of the frame A, above the inner end of the inclined feed-table B, as shown in figs. 2 and 3. The ends of the shaft of the threshing-drum A′ have pulleys or belt-wheels, *a a′*, secured upon them, as shown in figs. 2 and 5. The pulley *a* has a belt, *b*, passing over it, which passes over a large pulley, *c*, below it, and the pulley *a′* has a belt, *c′*, passing over it, which also passes over a pulley, *d*, below it. Below the threshing-drum A′ is a slatted rack or platform, C, which extends to the opposite end of the frame A, and inclines toward said drum, as shown in figs. 2 and 3. This rack C is slotted longitudinally, the number of slots corresponding to the number of shaking-bars which play through them. Besides the slots, it will be seen by reference to fig. 2, that the slats, between the longitudinal slots or spaces, are thickly perforated for the purpose of allowing the free passage of grain and chaff through the rack, while the straw is moved over the rack and discharged from its highest end. This rack C is hinged at its lowermost end, beneath the drum A′, to the sides of the frame or box A, and its opposite end rests upon ledges, *e*, projecting from the inner sides of said frame or box A. By thus attaching the slatted rack to its box or frame, one end of this rack can be raised and access obtained to the devices beneath it. Beneath the slatted and perforated grain-rack C is a series of longitudinal blades, D D D, having their upper edges notched or serrated like saw-teeth, or in any other suitable manner. These blades are secured to two horizontal transverse rods, $d'$ $d'$, which rods are secured at their ends to short crank-arms, $f f f' f'$, which have their bearings in the longitudinal sides of frame A, as shown in fig. 5. These blades are parallel to each other, and arranged upon the rods $d'$ $d'$, so as to rise and descend through the longitudinal spaces between the slats of rack C. The crank-arms $f'$ $f'$ have wheels or pulleys, $e$ $g$, secured to them outside of the frame A, which wheels or drums are connected together by means of a pitman, $g'$, the ends of which are pivoted eccentrically to the outer faces of said wheels or pulleys, as shown in fig. 1. By means of the pitman-rod $g'$ both cranks $f'$ $f'$ will receive the same motion, and both the front and rear ends of the several blades D will be raised and depressed simultaneously.

The throw of the cranks to which the rods $d'$ $d'$ are secured should be such that the up-stroke of said cranks will move the serrated edges of the blades D some distance above the upper surface of the slatted rack C, and in descending, the cranks should move the upper edges of said blades below and clear of the rack C. The cranks give a vertical motion to the blades, and, at the same time, a longitudinal movement. These movements of the serrated blades D communicate rapid shaking-movements to the straw, and, at the same time, move the straw, by steps, toward the highest end of the rack. During this tossing motion of the straw the grain and chaff will be separated from it, and will fall through the openings made through the grain-rack upon inclined planes $h$ $h$, and directly into a central longitudinal trough, J.

The trough J is arranged in the middle of the width of the frame A, beneath the blades or shakers D, and the inclined planes $h$ $h$ will conduct the grain, which does not fall directly into the trough J, into this trough. Within trough J is a screw-conveyer, K, which is supported at its ends by suitable bearings, and rotated, so as to convey the grain to one end of said trough, where it is discharged into a suitable receiver, or upon riddles, which will separate the grain from impurities. The trough J and its conveyer K may be inclined toward the threshing-end of the machine, and the shaft of the conveyer may have a pulley, $p$, upon it, which, by means of a belt passing over it, and also over a pulley, $r$, on the shaft of pulley $d$, will give a rotary motion to this conveyer.

I do not desire to confine my invention to the means herein shown of communicating motion to the several parts for threshing, and separating, and conveying, as other well-known mechanical means may be employed in their stead; nor do I desire to confine myself to having the grain-rack inclined and pivoted, as described, though I prefer to have this rack thus arranged and attached.

By my general arrangement and construction, the cost of producing a complete thresher and separator may be materially reduced, and operated with less power and cost of repairs than the machines hitherto employed for a like purpose, and the process of separating the grain from the straw may be accomplished at much better advantage than when riddles are relied upon for doing the entire work of separation.

Having described my invention, what I claim as new, and desire to secure by Letters Patent, is—

1. A longitudinally-slatted grain-rack or platform, C, constructed substantially as described, in combination with vertically and longitudinally-moving shakers D, arranged so as to play between the slats of said rack, substantially as described.

2. The combination of a threshing-device, a perforated and longitudinally-slatted stationary rack, C, and blades or straw-shakers D, operating substantially as described.

3. A stationary or movable rack, C, composed of perforated slats, having longitudinal spaces between them, in combination with serrated blades D, arranged and operated substantially as described.

4. The slatted and perforated grain-rack, arranged so as to incline toward the threshing-device, and hinged to the main box or frame A, substantially as described.

5. The combination of a slatted rack or grain-platform, C, the serrated grain or straw-shakers, operating through said grain-rack and a conveyer, arranged and operating substantially as described.

HUGH W. MATTHEWS.

Witnesses:

CHESTER KINNEY,

JAMES HALL.